United States Patent
Jeong et al.

(10) Patent No.: US 11,615,574 B2
(45) Date of Patent: Mar. 28, 2023

(54) SYSTEM AND METHOD FOR RENDERING 6 DEGREE-OF-FREEDOM VIRTUAL REALITY

(71) Applicant: MAXST CO., LTD., Seoul (KR)

(72) Inventors: Tae Hong Jeong, Gyeonggi-do (KR); Kyu Sung Cho, Gyeonggi-do (KR); Tae Yun Son, Gyeonggi-do (KR); Jae Wan Park, Gyeonggi-do (KR)

(73) Assignee: MAXST CO., LTD., Seoul (KR)

( * ) Notice: Subject to any disclaimer, the term of this patent is extended or adjusted under 35 U.S.C. 154(b) by 0 days.

(21) Appl. No.: 17/474,189

(22) Filed: Sep. 14, 2021

(65) Prior Publication Data

US 2022/0414966 A1 Dec. 29, 2022

(30) Foreign Application Priority Data

Jun. 24, 2021 (KR) .................. 10-2021-0082208

(51) Int. Cl.
*G06T 15/00* (2011.01)

(52) U.S. Cl.
CPC .......... *G06T 15/00* (2013.01); *G06T 2215/16* (2013.01)

(58) Field of Classification Search
CPC ....... G06T 15/40; G06T 15/20; G06T 15/205; G06T 19/006; G06T 2210/21; G06T 17/00; G06T 2219/028; G06F 3/04815; G06F 3/011

See application file for complete search history.

(56) References Cited

U.S. PATENT DOCUMENTS

| | | | | |
|---|---|---|---|---|
| 2013/0076762 A1* | 3/2013 | Heggelund | ............... | G06T 1/00 345/522 |
| 2018/0322691 A1* | 11/2018 | Mitchell | ................. | G06T 15/06 |
| 2020/0027261 A1* | 1/2020 | Briggs | ................. | H04N 13/344 |
| 2021/0358211 A1* | 11/2021 | Kim | ......................... | G06T 7/90 |

FOREIGN PATENT DOCUMENTS

| KR | 10-2005-0047322 A | 5/2005 |
|---|---|---|
| KR | 10-2011-0112705 A | 10/2011 |
| KR | 10-1451966 B1 | 10/2014 |

* cited by examiner

*Primary Examiner* — Hau H Nguyen
(74) *Attorney, Agent, or Firm* — The PL Law Group, PLLC

(57) ABSTRACT

A system for rendering 6 degree-of-freedom virtual reality according to an embodiment of the present disclosure includes a visibility test module performing a visibility test for determining whether a current point of interest where a main viewpoint is directed is visible for each of a plurality of reference viewpoints and generating visibility information by identifying the number of invisible fragments of each reference viewpoint according to the performance result, a reference viewpoint selection module selecting a final reference viewpoint for a rendering process for a current frame based on the visibility information for each of the plurality of reference viewpoints and a preset selection criterion, and a rendering process module performing an image-based rendering process by using a color image and a depth image corresponding to the final reference viewpoint.

16 Claims, 13 Drawing Sheets

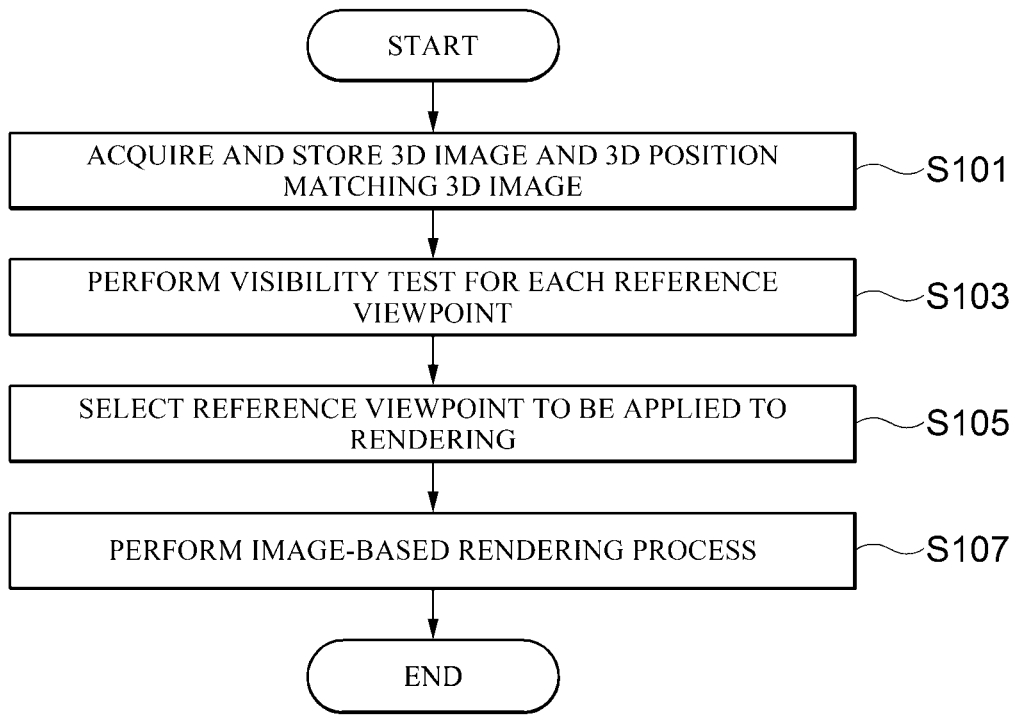

SYSTEM AND METHOD FOR RENDERING 6 DEGREE-OF-FREEDOM VIRTUAL REALITY

CROSS-REFERENCE TO RELATED APPLICATION(S)

This application claims the benefit under 35 USC § 119(a) of Korean Patent Application No. 10-2021-0082208, filed on Jun. 24, 2021, in the Korean Intellectual Property Office, the entire disclosure of which is incorporated herein by reference for all purposes.

BACKGROUND

1. Field

Embodiments of the present disclosure relate to a system and method for rendering a 6 degree-of-freedom virtual reality.

2. Description of Related Art

Image-based rendering is a technology for generating a visual stimulus close to the real thing by using an image of a real scene. The technology may be suitable for real-time rendering since the technology utilizes what is stored in the image instead of calculating the complex interactions of light and materials.

Meanwhile, when the above-mentioned image-based rendering is implemented, the viewpoint may move in parallel, and in this process, a hidden area may be revealed, which may be a cause of visual artifacts such as noise and distortion.

Examples of the related art include Korean Patent Registration No. 10-1451966 (Date: Oct. 10, 2014).

SUMMARY

Embodiments of the present disclosure are intended to provide a system and method for rendering 6 degree-of-freedom virtual reality in real time based on a 360-degree image using an optimal reference viewpoint.

In one general aspect, there is provided a system for rendering 6 degree-of-freedom virtual reality, including: a visibility test module configured to perform a visibility test for determining whether a current point of interest (POI) where a main viewpoint is directed is visible for each of a plurality of reference viewpoints by using 3D geometric information including a 3D image and a 3D position matching the 3D image, and generate visibility information by identifying the number of invisible fragments of each reference viewpoint according to the performance result; a reference viewpoint selection module configured to select a final reference viewpoint for a rendering process for a current frame based on the visibility information for each of the plurality of reference viewpoints and a preset selection criterion, the selecting of the final reference viewpoint being performed by selecting valid reference viewpoints for the rendering process and then selecting the final reference viewpoint by assigning an expression score to each of the selected valid reference viewpoints; and a rendering process module configured to perform an image-based rendering process by using a color image and a depth image corresponding to the final reference viewpoint.

The visibility test module may generate depth information of where the reference viewpoint is directed with respect to the reference viewpoint and generates a depth cubemap by using the generated depth information, the generating of the cubemap being performed by acquiring the depth information indicating a distance to an input geometry in a 3D space through an imaging device located at a position of the reference viewpoint in a state in which the input geometry is located in the 3D space and generating the depth cubemap by applying the acquired depth information all to one image.

The visibility test module may generate a mesh from a point cloud by using a geometry shader and transform feedback when generating the depth cubemap.

The visibility test module may generate POI information based on a plurality of POIs where the main viewpoint is directed to store the generated POI information, and extract the POI information during the visibility test for each reference viewpoint to use the extracted POI information.

The visibility test module may identify the number of invisible fragments for each reference viewpoint by performing a depth test based on the depth cubemap with respect to the reference viewpoint and the POI information with respect to the main viewpoint and incrementing a count each time the invisible fragment for the reference viewpoint is generated, and determine that a fragment is an invisible fragment when a distance between a position of the reference viewpoint and the current POI of the main viewpoint is longer than the depth distance of the reference viewpoint.

The reference viewpoint selection module may select the valid reference viewpoints based on any one of a position criterion for being adjacent to the main viewpoint, a field-of-view criterion for being included in a field of view of the main viewpoint, a criterion combining the position criterion and the field-of-view criterion, and an arbitrary setting criterion, from among all the reference viewpoints.

The criterion combining the position criterion and the field-of-view criterion may be a criterion for selecting, as the valid reference viewpoint, a reference viewpoint included in a preset radius with respect to the main viewpoint and included in a field-of-view frustum of the main viewpoint, from among all the reference viewpoints, selecting, as the valid reference viewpoint, a reference viewpoint included in the preset radius with respect to the main viewpoint and included in a main viewpoint-based modified field-of-view frustum, selecting, as the valid reference viewpoint, a reference viewpoint included in a preset number of reference viewpoints adjacent to the main viewpoint and included in the field-of-view frustum of the main viewpoint, or selecting, as the valid reference viewpoint, a reference viewpoint included in the preset number of reference viewpoints adjacent to the main viewpoint and included in main viewpoint-based modified field-of-view frustum.

The arbitrary setting criterion may be a criterion for selecting reference viewpoints within a predetermined range from the main viewpoint from among all the reference viewpoints, and selecting a reference viewpoint within a preset adjacent range from among the selected reference viewpoints and additionally selecting a reference viewpoint included in a main viewpoint-based modified field-of-view frustum from among remaining unselected reference viewpoints.

The reference viewpoint selection module may additionally select the valid reference viewpoints based on a criterion for being adjacent to the main viewpoint, when the number of selected valid reference viewpoints is less than a minimum required number criterion, and select the valid reference viewpoints such that the number of valid reference viewpoints coincides with a maximum required number criterion based on a criterion for selecting the reference viewpoints in an order of adjacency to the main viewpoint or a criterion for selecting the reference viewpoints alternately between a criterion for being adjacent to the main viewpoint and a criterion for being far away from the main viewpoint, from among all the reference viewpoints, when the number of selected valid reference viewpoints is greater than or equal to the maximum required number criterion.

The reference viewpoint selection module may select the final reference viewpoint by assigning the expression score for each valid reference viewpoint according to the number of invisible fragments of each of the selected valid reference viewpoints and an expression scoring criterion based on displacement between the main viewpoint and the reference viewpoint.

The reference viewpoint selection module may determine that any one of Lp norm of a vector of a displacement between a main viewpoint and a reference viewpoint, an exponential function of a magnitude of the displacement between the main viewpoint and the reference viewpoint, a log function of the magnitude of the displacement between the main viewpoint and the reference viewpoint, or any other function of the magnitude of the displacement between the main viewpoint and the reference viewpoint is a distance between the main viewpoint and the reference viewpoint, when the displacement between the main viewpoint and the reference viewpoint is calculated.

The reference viewpoint selection module may convert the number of invisible fragments for each reference viewpoint and the distance into a single value to determine an objective function and generate the expression score for each reference viewpoint, by performing the conversion into the single value by weighted-summing the number of invisible fragments for each reference viewpoint and the distance or rank-summing the number of invisible fragments for each reference viewpoint and the distance.

The reference viewpoint selection module may select the preset number of final reference viewpoints in an order from the lowest expression score, or select the final reference viewpoints from among all valid reference viewpoints such that visible regions between the final reference viewpoints do not overlap.

The rendering process module may reflect a criterion when color of the final reference viewpoint is selected, the criterion including at least one of a first criterion for setting a weight to be higher as the main viewpoint and the reference viewpoint are closer to each other, assuming that a fragment of interest is visible from the final reference viewpoint, a second criterion for setting a weight to be higher as the global spatial coordinates of the fragment of interest and the reference viewpoint are closer to each other, assuming that the fragment of interest is visible from the final reference viewpoint, and a third criterion for assigning a weight based on a result of the visibility test of each final reference viewpoint.

In another general aspect, there is provide a method for rendering a 6-degree-of-freedom virtual reality, including: storing 3D geometric information including a 3D image and a 3D position matching the 3D image; performing a visibility test for determining whether a current POI where a main viewpoint is directed is visible for each of a plurality of reference viewpoints by using the 3D geometric information; generating visibility information by identifying the number of invisible fragments of each reference viewpoint according to the performance result; selecting a final reference viewpoint for a rendering process for a current frame based on the visibility information for each of the plurality of reference viewpoints and a preset selection criterion; and performing an image-based rendering process by using a color image and a depth image corresponding to the final reference viewpoint.

The performing of the visibility test may include: generating depth information of where the reference viewpoint is directed with respect to the reference viewpoint; generating a depth cubemap by using the generated depth information; generating POI information based on a plurality of POIs where the main viewpoint is directed to store the generated POI information; and performing a depth test based on the depth cubemap with respect to the reference viewpoint and the POI information with respect to the main viewpoint.

The generating of the visibility information may include identifying the number of invisible fragments for each reference viewpoint by incrementing a count each time an invisible fragment for the reference viewpoint is generated, during the depth test.

The selecting of the final reference viewpoint may include: selecting valid reference viewpoints for the rendering process; and selecting the final reference viewpoint by assigning an expression score to each of the selected valid reference viewpoints.

The selecting of the final reference viewpoint may include selecting the final reference viewpoint by assigning the expression score for each valid reference viewpoint according to the number of invisible fragments of each of the selected valid reference viewpoints and an expression scoring criterion based on displacement between the main viewpoint and the reference viewpoint.

BRIEF DESCRIPTION OF THE DRAWINGS

FIG. 17 is a flowchart for describing a method for rendering a 6-DOF virtual reality according to an embodiment of the present disclosure.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

Figure 1:
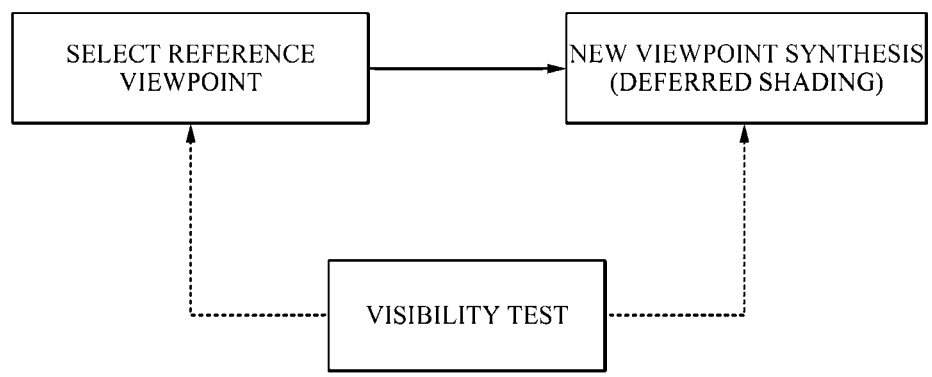
FIG. 1 is an overall conceptual diagram for describing a rendering process according to an embodiment of the present disclosure.

Referring to FIG. 1, in embodiments of the present disclosure, selecting a reference viewpoint to be applied to rendering and performing rendering of a new viewpoint synthesis by using the selected reference viewpoint may be included. When selecting the reference viewpoint, a system 200 for rendering may select an optimal reference viewpoint from among all reference viewpoints by performing a real-time visibility test, which will be described in detail later. In addition, the system 200 for rendering may apply deferred shading when performing image-based rendering through new viewpoint synthesis.

Figure 2:
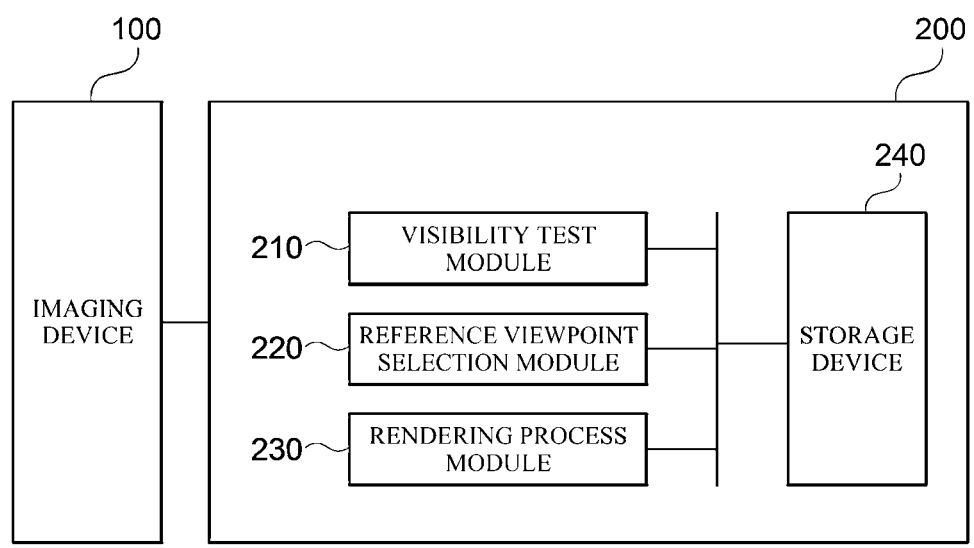
FIG. 2 is a block diagram for describing a system for rendering a 6-degree-of-freedom (DOF) virtual reality according to an embodiment of the present disclosure.

FIG. 2 is a block diagram for describing a system for rendering a 6-degree-of-freedom (DOF) virtual reality according to an embodiment of the present disclosure.

An imaging device 100 may be configured to capture an image. The imaging device 100 disclosed in the embodiment of the present disclosure may have a viewing angle of 90 degrees, and using the viewing angle, may capture images in six directions, up, down, left, right, front, and back, 360 degrees with respect to a first direction (e.g., horizontal) and 180 degrees with respect to a second direction (e.g., vertical). For example, the imaging device 100 may be a camera, but is not limited thereto, and may have any configuration capable of capturing an image.

Figure 3:
FIG. 3 is an exemplary diagram of a 360-degree panoramic image input for a rendering process according to an embodiment of the present disclosure.

FIG. 3 shows an exemplary diagram of a 360-degree panoramic image captured by the imaging device 100 and input for a rendering process.

The system 200 for rendering a 6-degree-of-freedom virtual reality (hereinafter referred to as a 'rendering system') may store a plurality of pieces of 3D geometric information including 3D images captured in multiple directions and 3D positions matching the 3D images in advance.

In this case, the 3D image may be defined as including an image of 360 degrees in the first direction (e.g., horizontally) and 180 degrees in the second direction (e.g., vertically). The 3D position may refer to a relative 3D position determined based on a preset zero-point position in an image-captured space. That is, the rendering system 200 may store several pairs of the above-described 3D images and 3D positions matching the 3D images in advance, and may utilize the pairs in an image-based rendering process such as the visibility test of a reference viewpoint.

The main viewpoint disclosed in the embodiments of the present disclosure refers to the user's viewpoint and includes the position and direction, and the reference viewpoint refers to a viewpoint including the position where a 360-degree image is captured by the imaging device 100.

In this case, the position and direction of the main viewpoint may be identified through sensors including a position sensor, an acceleration sensor, a gyro sensor, a compass sensor, a motion recognition sensor, a geomagnetic sensor, a displacement sensor, and a GPS sensor, but the sensors are not limited thereto and any sensor capable of identifying the main viewpoint, that is, the user's position and gaze direction, will be applicable. The sensors may be implemented in a form applied to a headset for simulating virtual reality, a wearable sensor form that may be worn by a user, and various types of mobile devices including smartphones and mobile pads, but are not limited thereto. Meanwhile, when a virtual reality is simulated on a wired terminal such as a personal computer (PC), the position and direction of the main viewpoint may be identified through information input by the user manipulating various input devices including a keyboard, a mouse, and a joystick.

The rendering system 200 may determine that reference viewpoints meeting a preset condition including adjacency to the position of the main viewpoint are related to rendering from among a plurality of reference viewpoints (all reference viewpoints) and select the reference viewpoints, and may perform rendering by using color information applied to the images of the selected reference viewpoints.

In embodiments of the present disclosure, when selecting a reference viewpoint for rendering from among all reference viewpoints, the visibility test may be performed on each of the reference viewpoints.

Figure 9:
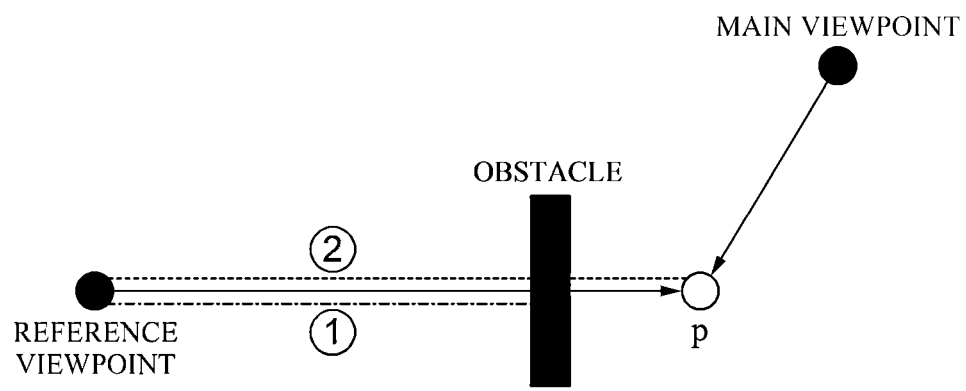

Since the above visibility test may not capture infinitely many images, there may be places that are hidden and invisible in a state where only position information on where images have been captured is present, and for this reason, the visibility test is performed to determine whether the point of interest (POI) where the main viewpoint is directed may be seen from the reference viewpoint. The visibility test may also be referred to as a depth test. The depth may include a depth to the POI from a reference viewpoint and a depth to be visible from the reference viewpoint, with respect to the depth to the observable POI from the main viewpoint. Referring to FIG. 9, when an obstacle such as a wall is positioned between the reference viewpoint and the POI P, the view may be given merely up to the obstacle from the reference viewpoint, which may be referred to as a depth to be visible from the reference viewpoint.

That is, the visibility test may determine whether the POI where the main viewpoint is directed may also be viewed from the reference viewpoint. In this principle, visibility or non-visibility of the fragment for each reference viewpoint may be determined by performing the visibility test with respect to the reference viewpoint.

For example, a situation may arise where the space under the table is invisible with respect to a user A who is seated in a chair, but a user B, who is located behind the user A, requests an image under the table. Accordingly, the user A may move backward so that the space under the table is visible. In this case, in a first image captured from the view of the user A, the space under the table may be shown, and in a second image, the space under the table may not be shown.

When the user A is referred to as the reference viewpoint and the user B is referred to as the main viewpoint, the rendering system 200 generates all depth information that may be visible with respect to the reference viewpoint. In addition, the rendering system 200 may identify a distance between the POI observable from the main viewpoint and the reference viewpoint.

Referring to FIG. 2, the rendering system 200 may include a visibility test module 210, a reference viewpoint selection module 220, a rendering process module 230, and a storage device 240.

In addition, the rendering system 200 may further include the above-described imaging device 100, but is not limited thereto, and may be implemented separately.

The visibility test module 210 may be configured to perform a visibility test for determining whether a current point of interest (POI) where the main viewpoint is directed is visible for each of a plurality of reference viewpoints by using 3D geometric information including a 3D image and a 3D position matching the 3D image, and generate visibility information by identifying the number of invisible fragments at each reference viewpoint according to the performance result.

The visibility test module 210 may generate depth information regarding where the reference viewpoint is directed with respect to the reference viewpoint, and may generate a depth cubemap by using the generated depth information. In this case, the visibility test module 210 may acquire the depth information, which indicates the distance to an input geometry in the 3D space through the imaging device 100 located at the position of the reference viewpoint in the state in which the input geometry is located in the 3D space, and generate the depth cubemap by applying the acquired depth information all to one image.

Since the position of the reference viewpoint is fixed, the depth information calculated with respect to the reference viewpoint may be stored and reused. Accordingly, the visibility test module 210 may generate the depth cubemap to utilize the same depth information regarding the reference viewpoint even if the main viewpoint is changed. To this end, the visibility test module 210 may use a frame buffer (not shown) having the cubemap as a depth attachment. The above-described depth cubemap may be based on an image captured 360 degrees in the first direction (e.g., horizontally) and 180 degrees in the second direction (e.g., vertically) with respect to the reference viewpoint. That is, the depth cubemap may refer to depth information as viewed from the reference viewpoint.

Figure 4:
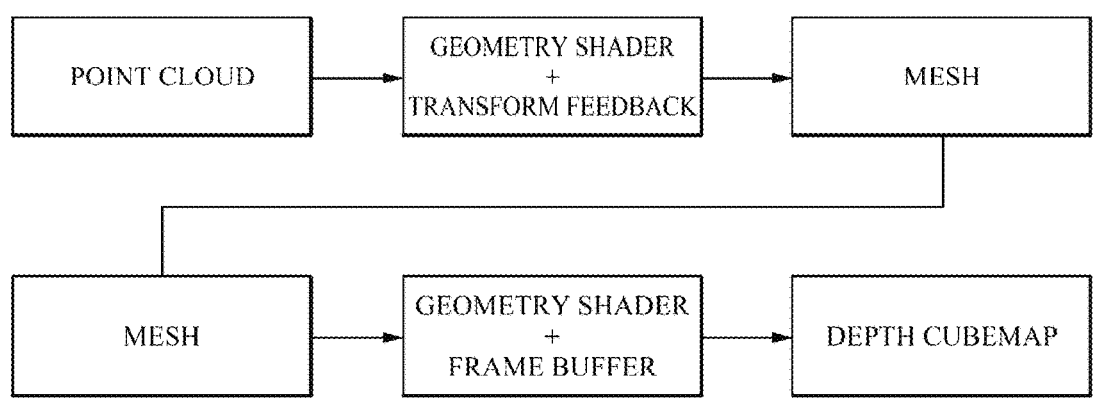
FIG. 4 is a conceptual diagram for describing a method for generating a depth cubemap according to an embodiment of the present disclosure.

Referring to FIG. 4, the visibility test module 210 may acquire distances in the 3D space by placing the input geometry in the 3D space and photographing the input geometry by the imaging device 100 placed at the position of the reference viewpoint, and may generate the depth cubemap by applying the distances all to one image. In this case, the visibility test module 210 may duplicate the input geometry on the geometry shader in six directions, up, down, left, right, front, and back to draw it at once. In this way, the visibility test module 210 may generate the depth cubemap with a single drawcall. In this case, the drawcall may mean a drawing request.

The geometric shader may include a function of generating figures such as a point, a line, and a triangle. A geometric shader program may be executed after a vertex shader is executed. The geometry shader program receives shape information from the vertex shader, and when three vertices enter the geometry shader, the shader may either delete all vertices or create and output more shapes. The geometric shader may be applied to render tessellation, shadow effects, or cubemaps in a single process.

Referring to FIG. 4, when generating the depth cubemap, the visibility test module 210 may generate a mesh from a point cloud by using the geometric shader and transformation feedback to obtain a dense depth. The mesh may have a form of a rectangle connecting two triangles to each other.

Specifically, 3D geometry is given as a point cloud, from which a determination as to the visibility from a certain viewpoint may not be possible. For this reason, each point cloud is copied to four points to form a rectangle, and the four points are stored to be used whenever necessary. In this case, the points that have been stored through copying may be referred to as transformation feedback.

In the present embodiments, a depth cubemap corresponding to each of all reference viewpoints may be generated, stored in an auxiliary storage device (e.g., a solid state drive (SSD)), and then loaded into a main storage device (e.g., a graphics processing unit (GPU)) when needed. This approach is for utilizing an auxiliary storage device when it is not possible to store all the depth cubemaps for respective reference viewpoints due to the capacity limitation of the main storage device. The approach may become more effective as the geometric information that composes a scene is larger. In the present embodiments, it is possible to allow for faster loading by using a texture block compression technique supported by hardware.

Figure 5A:
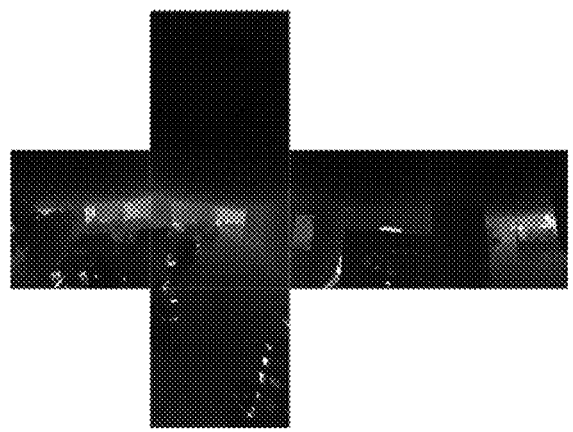
FIGS. 5A and 5B are diagrams for illustrating an example of a depth cubemap and a visualization thereof, according to an embodiment of the present disclosure.
Figure 5B:

FIGS. 5A and 5B may be diagrams illustrating an example (5A) of the depth cubemap and a visualization thereof (5B). In this case, 5B may be a visualization of an equirectangular projection of the depth cubemap. The equirectangular projection may refer to a projection method in which easting and northing directions form a right angle. In FIGS. 5A and 5B, a white color may refer to 'relatively distant', and a black color may refer to 'relatively close'.

The visibility test module 210 may generate POI information based on a plurality of POIs where the main viewpoint is directed and store the generated POI information, and may extract the POI information during the visibility test for each reference viewpoint and use the extracted POI information. In this case, the POI information may refer to a position that is visible from the main viewpoint.

Figure 6:
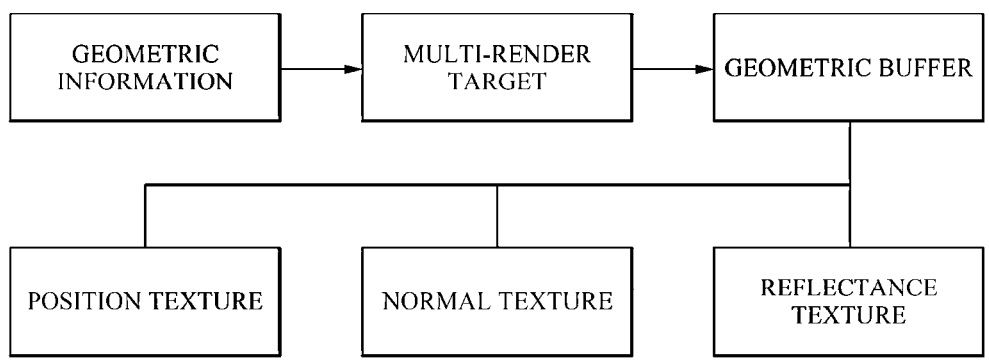
FIG. 6 is a conceptual diagram illustrating a method for generating point of interest (POI) information according to an embodiment of the present disclosure.

Referring to FIG. 6, the visibility test module 210 may generate POI information in advance with respect to the main viewpoint when the visibility test is performed at each reference viewpoint for the position that is visible from the main viewpoint. In this case, the visibility test module 210 may utilize a geometric buffer (G-Buffer) when the POI information is generated. In this case, the geometric buffer may refer to a bundle of textures in which 3D geometric information is divided and stored.

Referring to FIG. 6, the visibility test module 210 may store 3D geometric information in the geometric buffer as a multi-render target. In this case, a render target may refer to a texture that is a target of information output, and the multi-render target may refer to a method of outputting information to multiple-render targets in a single drawcall.

In consideration that the position that is visible from the main viewpoint is limited, the visibility test module 210 generates, in advance, POI information with respect to the main viewpoint and stores the generated POI information in the geometric information, and utilizes the POI information stored in the geometric buffer when the visibility test is performed at each reference viewpoint. In this case, information on the POI that is visible from a specific main viewpoint is generated on the assumption that the position of the main viewpoint does not change. The above-described POI information is information to be utilized in a subsequent rendering process, and may not correspond to an additional operation for the present stage.

In embodiments of the present disclosure, binocular rendering required for virtual reality implementation may be processed to simultaneously generate position information for two main viewpoints corresponding to the right eye and the left eye. The entire process may be performed with only the single drawcall through multiple-render targets.

As illustrated in FIG. 6, the geometry buffer may include not only a position texture, but also a normal texture containing a vertical vector at the surface and a reflectance texture containing color.

Figure 7:
FIG. 7 is an exemplary diagram for illustrating a visualization of POI information according to an embodiment of the present disclosure.

FIG. 7 may be an exemplary diagram for illustrating a visualization of POI information corresponding to the position texture in the geometric buffer. FIG. 7 represents a visualization of the position texture in the geometric buffer, which is POI information, on X, Y, and Z axes, with red, green, and blue colors, respectively.

Through the above-described process, in embodiments of the present disclosure, when a visibility test is performed at each reference viewpoint for a position that is visible from the main viewpoint, the calculation may be simplified by reducing the computational complexity as compared with the general method of iteratively rendering the whole geometry for the main viewpoint at every reference viewpoint test, and thus an effect of reducing the rendering time may be expected.

As a result of performing the visibility test for each reference viewpoint, the visibility test module 210 may check an invisible state to count the number of invisible fragments. In this case, a process of counting the number of invisible fragments may be performed in parallel through hardware acceleration. The visibility determination of each fragment may be performed in parallel.

Specifically, the visibility test module 210 may identify the number of invisible fragments for each reference viewpoint by performing a depth test based on the depth cubemap with respect to the reference viewpoint and the POI information with respect to the main viewpoint, and incrementing a count each time the invisible fragment for the reference viewpoint is generated.

In this case, the visibility test module 210 may determine that a fragment is an invisible fragment when a distance between a position of the reference viewpoint and the current POI of the main viewpoint is longer than the depth distance of the reference viewpoint.

Figure 8:
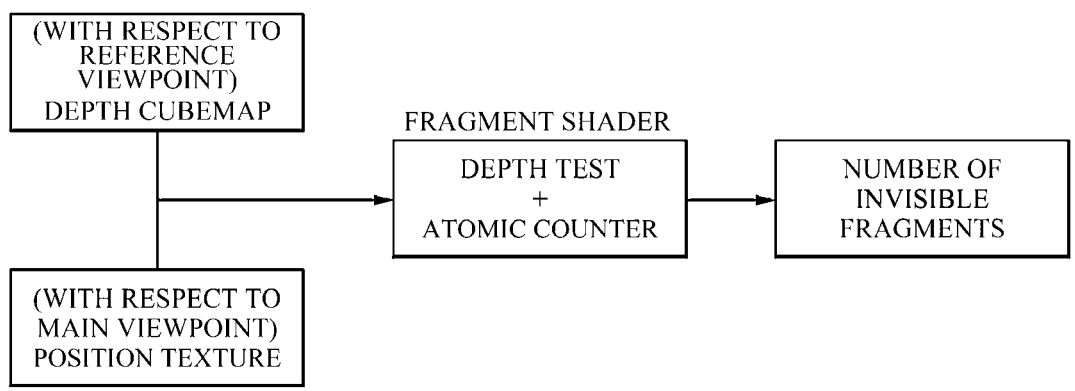
FIGS. 8 and 9 are conceptual diagrams for describing a visibility test method according to an embodiment of the present disclosure.

Referring to FIGS. 8 and 9, the visibility test module 210 may receive, as inputs, a depth cubemap that is the distance (①) with respect to the reference viewpoint, and a position texture with respect to the main viewpoint that is the distance (②) between the position of the reference viewpoint and the current POI of the main viewpoint. In this case, the current POI of the main viewpoint may be defined as referring to a position that the main viewpoint is currently facing.

Referring to FIGS. 8 and 9, the visibility test module 210 may determine that there is no visibility to the fragment of the reference viewpoint when ②>① and there is visibility to the fragment of the reference viewpoint when ②≤①, through the depth test as shown in FIG. 9.

Specifically, the visibility test module 210 may perform a visibility test on all fragments at each reference viewpoint through the following process.

First, for p of FIG. 9, which is a specific POI of the main viewpoint corresponding to a specific fragment f, the visibility test module 210 may calculate a reference viewpoint vector e from v to p, which are specific reference viewpoint positions.

Next, the visibility test module 210 may convert e expressed in the global coordinate system into a vector e' expressed in the relative coordinate system with respect to v.

Next, the visibility test module 210 may acquire a depth value d(①) corresponding to e', from the depth cubemap of v.

Next, the visibility test module 210 may calculate a length (②) |e'| of e' corresponding to the distance from v to p.

The visibility test module 210 may determine that the fragment f is in an 'invisible' state when d<|e'|, and may determine that the fragment f is in a 'visible' state when d≥|e'|.

The visibility test module 210 may store and reuse visibility information (invisible or visible) in a texture in order to improve rendering performance. In this case, it will be natural that the visibility information is assigned identification information and is stored while being matched with identification information on the related reference viewpoint or fragment. The visibility test module 210 may utilize an array texture and an image load/store API to simultaneously generate visibility textures corresponding to an arbitrary number of reference viewpoints. The array texture, which is a texture in which image arrays of the same size are included for each mipmap level, may include several layers and store a texture element (texel) in each layer. The image load/store API may refer to a function of a shader capable of reading and writing images arbitrarily.

Figure 10:
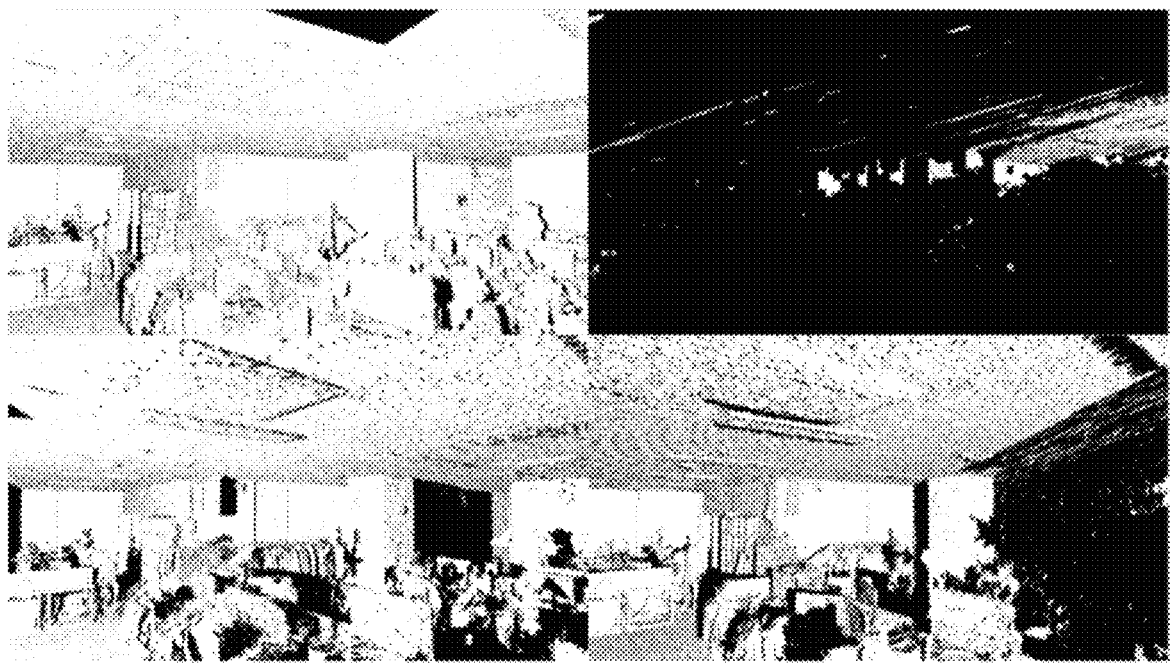
FIG. 10 is an exemplary diagram for illustrating a visualization of a visibility texture according to an embodiment of the present disclosure.

Visibility information of one reference viewpoint may be stored in a layer corresponding to the reference viewpoint through 3D texture coordinates. At the time of subsequent rendering, when being used, each layer in the array texture may be considered as an individual visibility texture by utilizing the texture view API. In this way, only the visibility texture of the specific reference viewpoint may be selectively accessed. FIG. 10 may represent an exemplary diagram for illustrating a visualization of a visibility texture according to an embodiment of the present disclosure. Here, black and white may correspond to 'invisible' and 'visible', respectively.

The visibility test module 210 may count the number of invisible fragments by incrementing an atomic counter in the order of calculation completion. This may be expected to have the effect of simultaneously performing the count of invisible fragments for several reference viewpoints. In addition, multiple main viewpoints may be processed simultaneously. In this case, as described above, 'simultaneous' may refer to a single drawcall. That is, it may be possible to test all the visibility of a preset number of reference viewpoints for a preset number of main viewpoints through a one-time drawing request.

In addition, the visibility test module 210 may increment the atomic counter whenever a determination is made that there is no visibility for a specific reference viewpoint. That is, the atomic counter may check whether the reference viewpoint is visible for each of the POIs of the main viewpoint for each reference viewpoint, and perform counting when the reference viewpoint is in an invisible state. The number of invisible fragments is checked by performing atomic counting on all of positions where the main viewpoint in 3D space is facing. In this case, the number checked by the atomic counter may refer to the number of invisible fragments.

The reference viewpoint selection module 220 may select a final reference viewpoint for a rendering process for a current frame based on the visibility information for each of the plurality of reference viewpoints and a preset selection criterion, the selecting of the final reference viewpoint being performed by selecting valid reference viewpoints for the rendering process and then selecting the final reference viewpoint by assigning an expression score to each of the selected valid reference viewpoints.

The reference viewpoint selection module 220 may select valid reference viewpoints from among all reference viewpoints based on a heuristic. Since valid reference viewpoints are selected in a situation where real-time performance is required, instead of all reference viewpoints, the effect of reducing the computation amount and the computation time may be expected.

The reference viewpoint selection module 220 may select the valid reference viewpoints based on any one of a position criterion for being adjacent to the main viewpoint, a field-of-view criterion for being included in a field of view of the main viewpoint, a criterion combining the position criterion and the field-of-view criterion, and an arbitrary setting criterion, from among all the reference viewpoints.

As an example, the reference viewpoint selection module 220 may select valid reference viewpoints from among all reference viewpoints based on a position criterion for being adjacent to the main viewpoint.

The reference viewpoint selection module 220 selects, as valid reference viewpoints, reference viewpoints included in a specific area (e.g., a specific radius (R)) from the position of the main viewpoint, or may select, as valid reference viewpoints, a preset number (e.g., K) of reference viewpoints adjacent to the position of the main viewpoint.

As another example, the reference viewpoint selection module 220 may select, as valid reference viewpoints, reference viewpoints related to the field of view of the main viewpoint from among all the reference viewpoints.

The reference viewpoint selection module 220 may define a field-of-view frustum by a specific viewpoint transformation and projection transformation pair and may perform clipping to select only reference viewpoints included in the field-of-view. The specific viewpoint transformation may refer to the position of the eyes of the main viewpoint and the direction in which the main viewpoint faces, and the projection transformation may refer to an angle to which the main viewpoint faces. The clipping may refer to culling out objects outside the field of view so as not to draw them.

In this case, the reference viewpoint selection module 220 may select reference viewpoints included in the field of view of the main viewpoint by using the same viewpoint transformation and projection transformation as those of the main viewpoint. In this case, the projection transformation may be changed. For example, the reference viewpoint selection module 220 may change the projection transformation by making the field of view wider with respect to the main viewpoint (wider field of view (FOV)), making the closest distance move a little farther (farther Z Near), or making the farthest distance move closer (closer Z Far). The Z Near may refer to a view to be set as the closest with respect to the main viewpoint, and Z Far may refer to a view to be set as the farthest with respect to the main viewpoint.

As yet another example, the reference viewpoint selection module 220 may select valid reference viewpoints based on the criterion combining the above-described position criterion and the field-of-view criterion; here, the reference viewpoint selection module 220 may select the reference viewpoints through the following four cases.

Firstly, the reference viewpoint selection module 220 may select, as valid reference viewpoints, reference viewpoints that are included within a preset radius with respect to the main viewpoint and are included in the field-of-view frustum of the main viewpoint, from among all reference viewpoints.

Secondly, the reference viewpoint selection module 220 may select, as valid reference viewpoints, reference viewpoints that are included within a preset radius with respect to the main viewpoint and are included in a main viewpoint-based modified field-of-view frustum, from among all reference viewpoints. In this case, the main viewpoint-based modified field-of-view frustum may refer to a frustum where a field of view that has been arbitrarily changed with respect to the main viewpoint is reflected. For example, the main viewpoint-based modified field-of-view frustum may include a field of view (FOV) that is equal to or wider than the field of view of the field-of-view frustum of the main viewpoint, the Z Near equal to or farther from the Z Near of the field-of-view frustum of the main viewpoint, and the Z Far equal to or closer to the Z Far of the field-of-view frustum of the main viewpoint, or the like.

Thirdly, the reference viewpoint selection module 220 may select, as valid reference viewpoints, reference viewpoints that are included in a preset number (e.g., K) adjacent to the main viewpoint and are included in the field-of-view frustum of the main viewpoint, from among all reference viewpoints.

Fourthly, the reference viewpoint selection module 220 may select, as valid reference viewpoints, reference viewpoints that are included in a preset number (e.g., K) adjacent to the main viewpoint and are included in the main viewpoint-based modified field-of-view frustum, from among all reference viewpoints.

Figure 11:
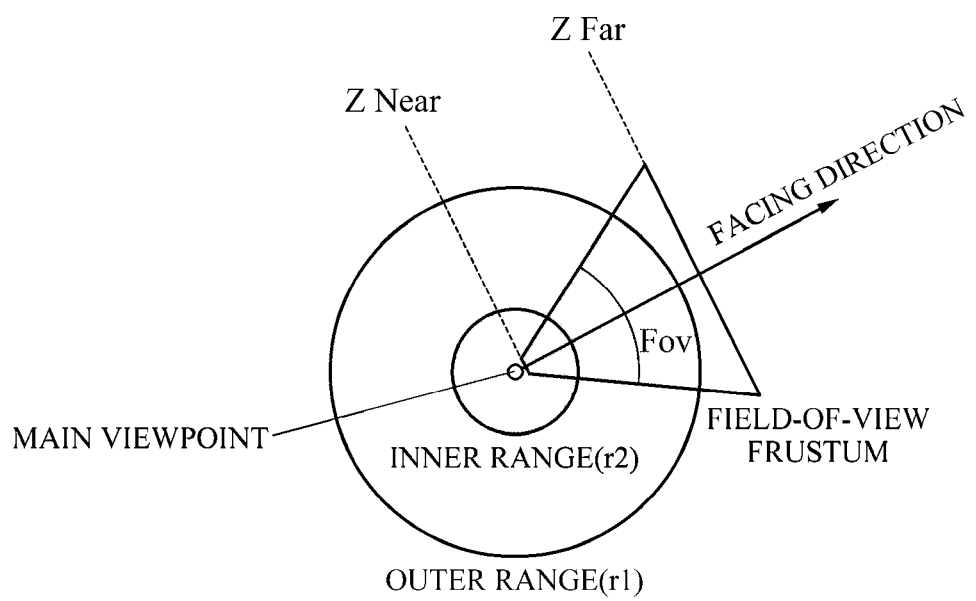
FIGS. 11 to 13 are exemplary diagrams for describing a method for selecting a reference viewpoint according to an embodiment of the present disclosure.

As yet another example, referring to FIG. 11, the reference viewpoint selection module 220 may select reference viewpoints within a certain range (outer range r1 in FIG. 11) from the main viewpoint from among all reference viewpoints, and may first select reference viewpoints within a preset adjacent range (inner range r2<outer range r1) from among the selected reference viewpoints. The reference viewpoint selection module 220 may additionally select a reference viewpoint within the main viewpoint-based modified field-of-view frustum, from among the remaining unselected reference viewpoints. For example, the main viewpoint-based modified field-of-view frustum may include a field of view (FOV) that is equal to or wider than the field of view of the field-of-view frustum of the main viewpoint, the Z Near equal to or farther from the Z Near of the field-of-view frustum of the main viewpoint, and the Z Far equal to or closer to the Z Far of the field-of-view frustum of the main viewpoint, or the like. The above r1 and r2 may be arbitrarily set by an operator.

The reference viewpoint selection module 220 may additionally select the valid reference viewpoints based on a criterion for being adjacent to the main viewpoint, when the number of valid reference viewpoints selected in the above process is less than a minimum required number (Min K) criterion. The reference viewpoint selection module 220 may select the valid reference viewpoints such that the number of valid reference viewpoints coincides with a maximum required number criterion based on a criterion for selecting the reference viewpoints in an order of adjacency to the main viewpoint or a criterion for selecting the reference viewpoints alternately between a criterion for being adjacent to the main viewpoint and a criterion for being far away from the main viewpoint, from among all the reference viewpoints, when the number of valid reference viewpoints selected in the above process is greater than or equal to the maximum required number criterion. This may be changed or added by the operator.

The reference viewpoint selection module 220 may sample only valid reference viewpoints through the above-described method. In this case, an acceleration structure for efficient spatial query may be used. For example, the acceleration structure may include, but is not limited to, a k-d tree, an octree, and an R tree.

For example, the reference viewpoint selection module 220 may select 14 valid reference viewpoints from among the 100 initial reference viewpoints through the above-described process, and may select 4 optimal final reference viewpoints through the following process.

The reference viewpoint selection module 220 may select an optimal final reference viewpoint set, that is, the final reference viewpoints by assigning the expression score for each valid reference viewpoint according to the number of invisible fragments of each of the selected valid reference viewpoints and an expression scoring criterion based on displacement between the main viewpoint and the reference viewpoint. In this case, the expression score is defined as an objective function, and a value minimizing this objective function may correspond to the final reference viewpoint.

Embodiments of the present disclosure may be formed of an objective function derived from two terms as follows. One applied to the objective function for calculating the expression score may be the number of invisible fragments derived through the visibility test, and the other may be the displacement between the main viewpoint and the reference viewpoint, which may be generalized as expressed in Equation 1.

$$\text{Expression score} = f(\text{number of invisible fragments, displacement between main and reference viewpoints}) \quad \text{[Equation 1]}$$

When the main viewpoint and the reference viewpoint match, 100% accurate rendering results without visual distortion will be obtained, but visual distortion may occur since the main viewpoint and the reference viewpoint do not match. Accordingly, the number of invisible fragments may be minimized by using the reference viewpoint set for minimizing the above-described objective function, and visual distortion due to displacement, which is the distance difference between the main viewpoint and the reference viewpoint, may be minimized.

The above-described expression score may be defined in various ways. First, the expression score may vary depending on a method of obtaining the distance between the main viewpoint and the reference viewpoint.

The reference viewpoint selection module 220 may determine that any one of Lp norm (p is 0, 1, 2, . . . , infinity) of a vector of a displacement between a main viewpoint and a reference viewpoint, an exponential function of a magnitude of the displacement between the main viewpoint and the reference viewpoint, a log function of the magnitude of the displacement between the main viewpoint and the reference viewpoint, or any other function of the magnitude of the displacement between the main viewpoint and the reference viewpoint is a distance between the main viewpoint and the reference viewpoint, when the displacement between the main viewpoint and the reference viewpoint is calculated.

According to the above-mentioned principle, the displacement between the main viewpoint and the reference viewpoint of Equation 1 may be defined by Equations 2 to 4 below. The displacement between the main viewpoint and the reference viewpoint in Equation 1 above may refer to a distance vector, and the distance in Equations 2 to 4 may refer to the magnitude of the distance vector.

$$\text{distance} = \|\text{main viewpoint} - \text{reference viewpoint}\|_p, \quad p = 0, 1, 2, \ldots, \infty \quad \text{[Equation 2]}$$

$$\text{distance} = \log(1 + \|\text{main viewpoint} - \text{reference viewpoint}\|_p) \quad \text{[Equation 3]}$$

$$\text{distance} = 1 - \exp(-\|\text{main viewpoint} - \text{reference viewpoint}\|_p) \quad \text{[Equation 4]}$$

Meanwhile, the displacement between the main viewpoint and the reference viewpoint may also be defined by a distance function derivable from other displacements, or the like, in addition to Equations 2 to 4 described above.

The reference viewpoint selection module 220 may generate an expression score for each reference viewpoint by converting the number of invisible fragments for each reference viewpoint and the aforementioned distance into a single value to determine an objective function. In this case, the reference viewpoint selection module 220 may set the objective function differently depending on a method of representing the number of invisible fragments and distance as a single value.

The reference viewpoint selection module 220 may perform the conversion into a single value by weighted-summing the two terms, that is, the number of invisible fragments for each reference viewpoint and the distance, or may perform the conversion into a single value by rank-summing the number of invisible fragments for each reference viewpoint and the distance, as in the following Equations 5 and 6. In this case, Equation 5 may be obtained by performing the conversion into a single value by weighted-summing the two terms, and Equation 6 may be obtained by performing the conversion into a single value by rank-summing the two terms. In this case, the weighted sum may be calculated by applying a weight arbitrarily set by the operator.

$$\text{objective function} = a^* (\text{number of invisible fragments}) + b^* (\text{distance}) \quad \text{[Equation 5]}$$

$$\text{objective function} = \text{RANK}(\text{number of invisible fragments}) + \text{RANK}(\text{distance}) \quad \text{[Equation 6]}$$

In Equations 5 and 6, the distance may refer to the distance disclosed in Equations 2 to 4. a and b may refer to weights.

The reference viewpoint selection module 220 may select optimal final reference viewpoints in two ways, depending on scene characteristics and hardware performance.

As an example, the reference viewpoint selection module 220 may select a higher preset number of final reference viewpoints in order from the lowest expression score. This may be very efficient since the expression score is computed only once. In this case, the lower expression score may be defined as the better expression score.

As another example, the reference viewpoint selection module 220 may select the final reference viewpoints from among all valid reference viewpoints such that visible regions between the final reference viewpoints do not overlap, in consideration of the interaction between reference viewpoints. In this case, the reference viewpoint selection module 220 may newly calculate expression scores of the remaining reference viewpoints whenever one reference viewpoint is selected. This is to exclude fragments that may be viewed from the first selected reference viewpoint in the invisible fragment counting process. The above-described "newly calculate" may refer to performing recalculation starting from counting the invisible fragments. In this case, the operation stage may be simplified by omitting the visibility test for the visible region of the previously selected reference viewpoint.

That is, by excluding overlapping of the visible regions between the final reference viewpoints, the reference viewpoint selection module 220 may perform the rendering process in which visible regions that do not overlap each other are reflected more.

In the process of selecting the above-described final reference viewpoints, the reference viewpoint selection module 220 may store and utilize visibility information in a stencil buffer or a texture (hereinafter, stencil). The stencil buffer may refer to a storage space for recording arbitrary information for each fragment and utilizing the recorded information for an operation.

Specifically, the reference viewpoint selection module 220 may select the final reference viewpoints through the following algorithm.

Firstly, the reference viewpoint selection module 220 may record all the fragments in the stencil in an invisible state.

Secondly, the reference viewpoint selection module 220 may perform a visibility test on a valid reference viewpoint set V. In this case, when f is written as 'visible' in the stencil for each fragment f, it may be discarded. When f is not recorded as 'visible' in the stencil for each fragment f, the following first and second processes may be performed for each valid reference viewpoint $v_i \in V$. In this case, the first process may determine the visibility of f based on $v_i$ and update the visibility texture of $v_i$, and the second process may increase the atomic counter of $v_i$ when f is 'invisible' based on $v_i$.

Thirdly, the reference viewpoint selection module 220 may assign an expression score to each $v_i$ based on the result of the visibility test.

Fourthly, the reference viewpoint selection module 220 may select one final reference viewpoint v* based on the expression score.

Fifthly, the reference viewpoint selection module 220 may record the 'visible' position of v* on the stencil and exclude v* from V.

Sixthly, the reference viewpoint selection module 220 may repeat the above-described second to fifth processes until a termination criterion is satisfied.

As an example, the above-described termination criterion may include terminating the algorithm when the target number of reference viewpoints is satisfied. For example, when a total of eight final reference viewpoints are selected, the algorithm may be terminated.

As another example, the termination criterion may include terminating the algorithm when a ratio of invisible fragments recorded on the stencil satisfies a threshold criterion. For example, if more than 95% of the fragments may be expressed, the algorithm may be terminated.

As yet another example, the termination criterion may combine the two methods described above. For example, selection of the final reference viewpoint is repeated until 95% or more of fragments may be expressed, but the algorithm may be terminated when the target number of reference viewpoints (e.g., a total of 8) is selected.

Figure 12:

A visualization of an example of stencil information at the time of terminating the above-described algorithm for selecting the final reference viewpoint may be illustrated in FIG. 12. Here, black and white may correspond to 'invisible' and 'visible', respectively.

The rendering process module 230 may perform image-based rendering by utilizing a color image and a depth image corresponding to the selected final reference viewpoint. In this case, the color image corresponding to the final reference viewpoint may be a 360-degree color image. That is, the rendering process module 230 extracts a color corresponding to the final reference viewpoint and performs rendering through positional recombination therefor.

Specifically, the rendering process module 230 may calculate the final color by weight-blending the 360-degree image texel corresponding to the reference viewpoint. In this case, the rendering process module 230 may set a weight in consideration of the main viewpoint, the reference viewpoint, and the global spatial position of the fragment of interest, and apply the weight. In this case, the fragment of interest may refer to a fragment of a position of interest viewed from the main viewpoint.

As an example, assuming that the fragment of interest is visible from the final reference viewpoint, the rendering process module 230 may reflect a first criterion for setting the weight to be higher as the main viewpoint and the reference viewpoint are closer to each other, when selecting the color of the final reference viewpoint.

As another example, assuming that the fragment of interest is visible from the final reference viewpoint, the rendering process module 230 may reflect a second criterion for setting the weight to be higher as global spatial coordinates of the fragment of interest and the reference viewpoint are closer to each other, when selecting the color of the final reference viewpoint.

As yet another example, the rendering process module 230 may reflect a third criterion for assigning a weight based on a result of the visibility test of each final reference viewpoint, when selecting the color of the final reference viewpoint.

When the fragment of interest is not visible from a specific final reference viewpoint, the rendering process module 230 determines that the weight of the corresponding final reference viewpoint is 0.

If the above-described conditions are expressed as equations, they may be as shown in Equations 7 to 10.

$$\text{output color} = (\text{normalization constant}) * \Sigma i(\text{color}_i * \text{weight}_i * \text{visibility}_i) \quad \text{[Equation 7]}$$

$$\text{normalization constant} = 1/\Sigma i(\text{weight}_i * \text{visibility}_i) \quad \text{[Equation 8]}$$

$$\text{weight} = f(\text{main viewpoint position, reference viewpoint position, fragment of interest position}) \to R \quad \text{[Equation 9]}$$

$$\text{visibility} = 1 \text{ if viewed, } 0 \text{ if not viewed} \quad \text{[Equation 10]}$$

i may refer to a reference viewpoint. In addition, the above-mentioned Equations 7 to 10 may be for one pixel. The fragment of interest position may refer to a current POI viewed from the main viewpoint. R may be a real number.

Depending on how to define the weight function, the output color may vary during the rendering process.

Figure 13:
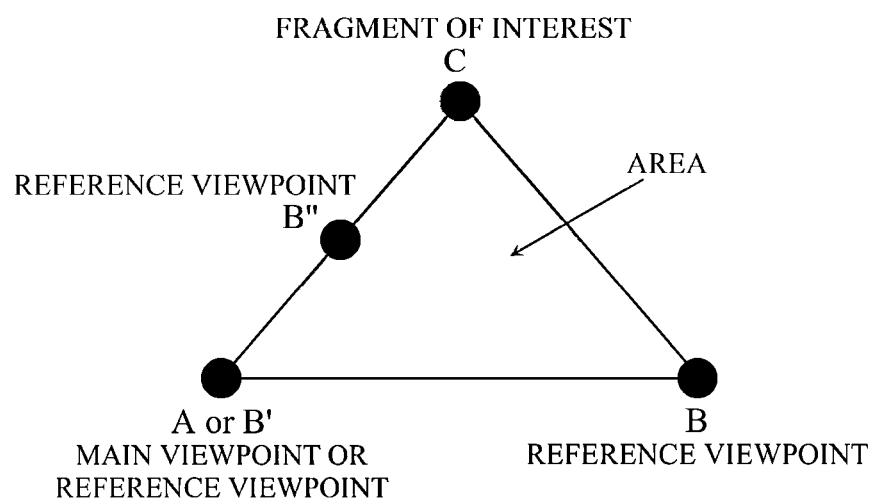

Referring to FIG. 13, the rendering process module 230 may define a weight function of Equations 11 and 12 based on the area (area of triangle ABC) formed through a main viewpoint position A, a reference viewpoint position B, and a fragment of interest position C.

$$\text{weight} = \exp(-\text{area of triangle } ABC) \qquad \text{[Equation 11]}$$

$$\text{weight} = \exp(-\text{square of area of triangle } ABC) \qquad \text{[Equation 12]}$$

The area of the triangle ABC may be 0 when two viewpoints A and B coincide (A and B' in FIG. 13) or when two gazes AC and BC coincide (AC and B'C, or AC and B"C in FIG. 13). In this case, the weight may be 1. When the area of the triangle ABC is 0 or smaller, the quality of the rendering result may be relatively good.

In contrast, when the three points ABC are far apart from each other, the area of the triangle ABC increases, and the weight may be zero. In this case, when the square of the area of the triangle ABC is applied, the effect that the operation may be relatively fast may be expected.

Figure 14:
FIG. 14 is an exemplary diagram of a new viewpoint synthesis result according to an embodiment of the present disclosure.
Figure 15:
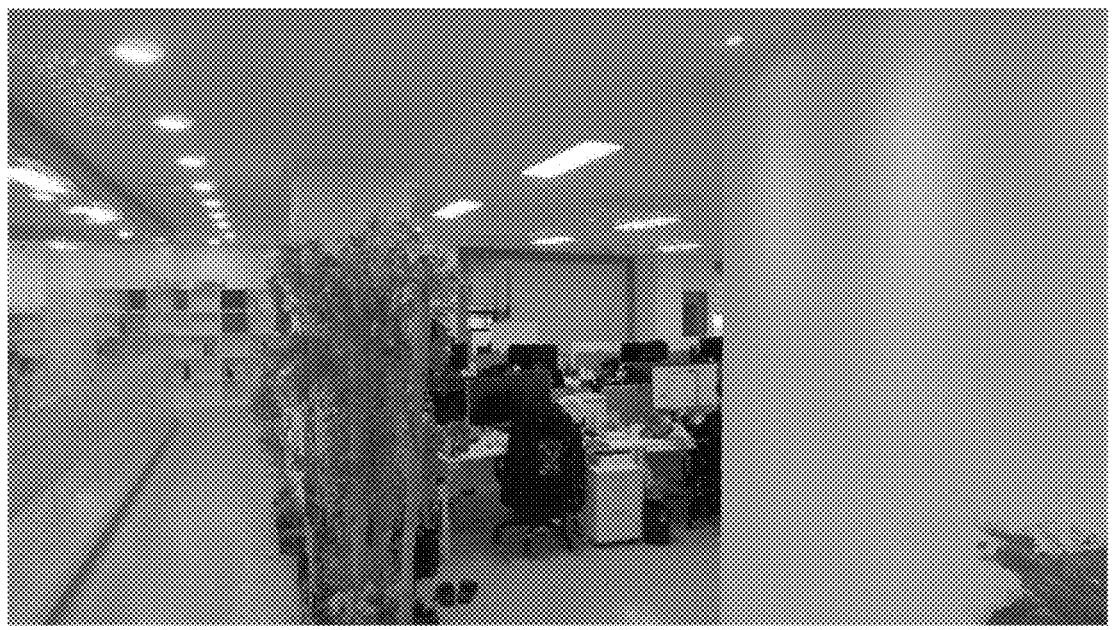
FIG. 15 is another exemplary diagram of the new viewpoint synthesis result according to an embodiment of the present disclosure.

FIG. 14 may illustrate an example of a new viewpoint synthesis result, which is the result of the rendering process, and FIG. 15 may illustrate another example of the new viewpoint synthesis result, which is the result of the rendering process.

The storage device 240 may be configured to store various types of information related to the operation of the rendering system 200. Although not illustrated, the storage device 240 may include the above-described frame buffer, auxiliary storage device, main storage device, geometric buffer, and the like depending on a form of storing information.

Figure 16:
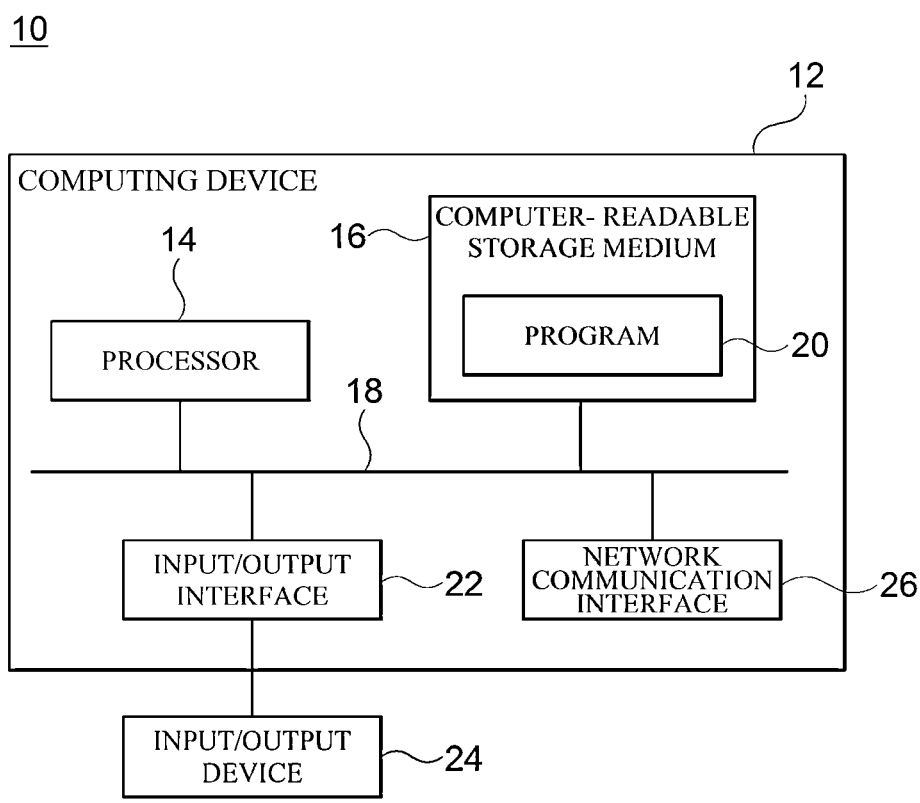
FIG. 16 is a block diagram for illustrating a computing environment including a computing device according to an embodiment of the present disclosure.

FIG. 16 is a block diagram for illustrating a computing environment 10 including a computing device suitable for use in exemplary embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the rendering system 200.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or any suitable combination thereof), one or more magnetic disk storage devices, optical disk storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

FIG. 17 is a flowchart for describing a method for rendering a 6-DOF virtual reality according to an embodiment of the present disclosure. The method illustrated in FIG. 17 may be performed, for example, by the above-described rendering system 200. In the illustrated flowchart, the method is divided into a plurality of steps; however, at least some of the steps may be performed in a different order, performed together in combination with other steps, omitted, performed in subdivided steps, or performed by adding one or more steps not illustrated.

In S101, the rendering system 200 may store 3D geometric information including a 3D image and a 3D position matching the 3D image.

In S103, the rendering system 200 may perform a visibility test for determining whether a current POI where a main viewpoint is directed is visible for each of a plurality of reference viewpoints by using the 3D geometric information.

In this case, the rendering system 200 may generate depth information of where the reference viewpoint is directed with respect to the reference viewpoint. Further, the rendering system 200 may generate a depth cubemap by using the generated depth information. In addition, the rendering system 200 may generate POI information based on a plurality of POIs where the main viewpoint is directed to store the generated POI information. The rendering system 200 may perform a depth test based on the depth cubemap with respect to the reference viewpoint and the POI information with respect to the main viewpoint.

In addition, the rendering system 200 may generate visibility information by identifying the number of invisible fragments of each reference viewpoint according to the performance result.

In this case, the rendering system 200 may identify the number of invisible fragments for each reference viewpoint by incrementing the count each time the invisible fragment for the reference viewpoint is generated, during the depth test.

In S105, the rendering system 200 may select a final reference viewpoint for a rendering process for a current frame based on the visibility information for each of the plurality of reference viewpoints and a preset selection criterion.

In this case, the rendering system 200 may select valid reference viewpoints for the rendering process. The rendering system 200 may select a final reference viewpoint by assigning an expression score to each of the selected valid reference viewpoints. Specifically, the rendering system 200 may select the final reference viewpoint by assigning the expression score for each valid reference viewpoint according to the number of invisible fragments of each of the selected valid reference viewpoints and an expression scoring criterion based on displacement between the main viewpoint and the reference viewpoint.

In S107, the rendering system 200 may perform an image-based rendering process by using a color image and a depth image corresponding to the final reference viewpoint.

In this case, the color image corresponding to the final reference viewpoint may be a 360-degree color image. That is, the rendering system 200 extracts a color corresponding to the final reference viewpoint and performs rendering through positional recombination therefor.

Specifically, the rendering system 200 may calculate the final color by weight-blending the 360-degree image texel corresponding to the reference viewpoint. In this case, the rendering system 200 may set a weight in consideration of the main viewpoint, the reference viewpoint, and the global spatial position of the fragment of interest, and apply the weight. In this case, the fragment of interest may refer to a fragment of a position of interest viewed from the main viewpoint.

Embodiments of the present disclosure may reduce visual distortion caused by revealing a hidden area when a viewpoint is moved in parallel, which is an element that inhibits the sense of immersion. In addition, embodiments of the present disclosure may provide real-time performance, thereby enabling more diverse interactions without compromising user experience. The above-described characteristics of the present disclosure make rendering performance improved in a 6-degree-of-freedom virtual reality environment, which, in turn, makes it possible to provide a good senses of immersion to the user. In addition, it will be natural that the real-time visibility test technique disclosed in the embodiments of the present disclosure may be utilized for other visual computing applications.

According to embodiments of the present disclosure, an optimal reference viewpoint is selected through a real-time visibility test and is reflected in image-based rendering, and thus it is possible to expect the effect of reducing visual artifacts such as disocclusion that occurs during 3D translation of the viewpoint caused by the 6-DOF viewpoint change in 360-degree image-based rendering and distortion caused by the difference in the distance between the main viewpoint and the reference viewpoint.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. A system for rendering 6 degree-of-freedom virtual reality, comprising:
   a visibility test module configured to perform a visibility test for determining whether a current point of interest (POI) where a main viewpoint is directed is visible for each of a plurality of reference viewpoints by using 3D geometric information including a 3D image and a 3D position matching the 3D image, and generate visibility information by identifying the number of invisible fragments of each reference viewpoint according to the performance result;
   a reference viewpoint selection module configured to select, among the plurality of reference viewpoints, a final reference viewpoint for a rendering process for a current frame, based on the visibility information for each of the plurality of reference viewpoints and a preset selection criterion, the selecting of the final reference viewpoint being performed by selecting valid reference viewpoints, among the plurality of reference viewpoints, for the rendering process and then selecting the final reference viewpoint based on an expression score by assigning the expression score to each of the selected valid reference viewpoints according to the number of invisible fragments of each of the selected valid reference viewpoints and displacement between the main viewpoint and the reference viewpoint; and
   a rendering process module configured to perform an image-based rendering process by using a color image and a depth image corresponding to the final reference viewpoint,
   wherein the main viewpoint is a user's viewpoint; and
   the plurality of reference viewpoints are a viewpoint including a position where an imaging device captures the 3D image.

2. The system for rendering 6 degree-of-freedom virtual reality of claim 1, wherein the visibility test module generates depth information of where the reference viewpoint is directed with respect to the reference viewpoint and generates a depth cubemap by using the generated depth information, the generating of the depth cubemap being performed by acquiring the depth information indicating a distance to an input geometry in a 3D space through an imaging device located at a position of the reference viewpoint in a state in which the input geometry is located in the 3D space and generating the depth cubemap by applying the acquired depth information all to one image.

3. The system for rendering 6 degree-of-freedom virtual reality of claim 2, wherein the visibility test module generates a mesh from a point cloud by using a geometry shader and transform feedback when generating the depth cubemap.

4. The system for rendering 6 degree-of-freedom virtual reality of claim 3, wherein the visibility test module generates POI information based on a plurality of POIs where the main viewpoint is directed to store the generated POI information, and extracts the POI information during the visibility test for each reference viewpoint to use the extracted POI information.

5. The system for rendering 6 degree-of-freedom virtual reality of claim 4, wherein the visibility test module:
   identifies the number of invisible fragments for each reference viewpoint by performing a depth test based on the depth cubemap with respect to the reference viewpoint and the POI information with respect to the main viewpoint and incrementing a count each time the invisible fragment for the reference viewpoint is generated; and
   determines that a fragment is an invisible fragment when a distance between a position of the reference viewpoint and the current POI of the main viewpoint is longer than the depth distance of the reference viewpoint.

6. The system for rendering 6 degree-of-freedom virtual reality of claim 5, wherein the reference viewpoint selection module selects the valid reference viewpoints based on any one of a position criterion for being adjacent to the main viewpoint, a field-of-view criterion for being included in a field of view of the main viewpoint, a criterion combining the position criterion and the field-of-view criterion, and an arbitrary setting criterion, from among all the reference viewpoints.

7. The system for rendering 6 degree-of-freedom virtual reality of claim 6, wherein the criterion combining the position criterion and the field-of-view criterion is a criterion for selecting, as the valid reference viewpoint, a reference viewpoint included in a preset radius with respect to the main viewpoint and included in a field-of-view frustum of the main viewpoint, from among all the reference viewpoints, selecting, as the valid reference viewpoint, a reference viewpoint included in the preset radius with respect to the main viewpoint and included in a main viewpoint-based modified field-of-view frustum, selecting, as the valid reference viewpoint, a reference viewpoint included in a preset number of reference viewpoints adjacent to the main viewpoint and included in the field-of-view frustum of the main viewpoint, or selecting, as the valid reference viewpoint, a reference viewpoint included in the preset number of reference viewpoints adjacent to the main viewpoint and included in main viewpoint-based modified field-of-view frustum.

8. The system for rendering 6 degree-of-freedom virtual reality of claim 6, wherein the arbitrary setting criterion is a criterion for selecting reference viewpoints within a predetermined range from the main viewpoint from among all the reference viewpoints, and selecting a reference viewpoint within a preset adjacent range from among the selected reference viewpoints and additionally selecting a reference viewpoint included in a main viewpoint-based modified field-of-view frustum from among remaining unselected reference viewpoints.

9. The system for rendering 6 degree-of-freedom virtual reality of claim 8, wherein the reference viewpoint selection module:
additionally selects the valid reference viewpoints based on a criterion for being adjacent to the main viewpoint, when the number of selected valid reference viewpoints is less than a minimum required number criterion; and
selects the valid reference viewpoints such that the number of valid reference viewpoints coincides with a maximum required number criterion based on a criterion for selecting the reference viewpoints in an order of adjacency to the main viewpoint or a criterion for selecting the reference viewpoints alternately between a criterion for being adjacent to the main viewpoint and a criterion for being far away from the main viewpoint, from among all the reference viewpoints, when the number of selected valid reference viewpoints is greater than or equal to the maximum required number criterion.

10. The system for rendering 6 degree-of-freedom virtual reality of claim 9, wherein the reference viewpoint selection module determines that any one of Lp norm of a vector of a displacement between a main viewpoint and a reference viewpoint, an exponential function of a magnitude of the displacement between the main viewpoint and the reference viewpoint, a log function of the magnitude of the displacement between the main viewpoint and the reference viewpoint, or any other function of the magnitude of the displacement between the main viewpoint and the reference viewpoint is a distance between the main viewpoint and the reference viewpoint, when the displacement between the main viewpoint and the reference viewpoint is calculated.

11. The system for rendering 6 degree-of-freedom virtual reality of claim 10, wherein the reference viewpoint selection module converts the number of invisible fragments for each reference viewpoint and the distance into a single value to determine an objective function and generate the expression score for each reference viewpoint, by performing the conversion into the single value by weighted-summing the number of invisible fragments for each reference viewpoint and the distance or rank-summing the number of invisible fragments for each reference viewpoint and the distance.

12. The system for rendering 6 degree-of-freedom virtual reality of claim 11, wherein the reference viewpoint selection module selects the preset number of final reference viewpoints in an order from the lowest expression score, or selects the final reference viewpoints from among all valid reference viewpoints such that visible regions between the final reference viewpoints do not overlap.

13. The system for rendering 6 degree-of-freedom virtual reality of claim 12, wherein the rendering process module reflects a criterion when color of the final reference viewpoint is selected, the criterion including at least one of a first criterion for setting a weight to be higher as the main viewpoint and the reference viewpoint are closer to each other, assuming that a fragment of interest is visible from the final reference viewpoint, a second criterion for setting a weight to be higher as the global spatial coordinates of the fragment of interest and the reference viewpoint are closer to each other, assuming that the fragment of interest is visible from the final reference viewpoint, and a third criterion for assigning a weight based on a result of the visibility test of each final reference viewpoint.

14. A method for rendering a 6-degree-of-freedom virtual reality, comprising:
storing 3D geometric information including a 3D image and a 3D position matching the 3D image;
performing a visibility test for determining whether a current point of interest (POI) where a main viewpoint is directed is visible for each of a plurality of reference viewpoints by using the 3D geometric information;
generating visibility information by identifying the number of invisible fragments of each reference viewpoint according to the performance result;
selecting a final reference viewpoint, among the plurality of reference viewpoints, for a rendering process for a current frame based on the visibility information for each of the plurality of reference viewpoints and a preset selection criterion; and
performing an image-based rendering process by using a color image and a depth image corresponding to the final reference viewpoint,
wherein the selecting of the final reference viewpoint comprises:
selecting valid reference viewpoints for the rendering process; and
selecting the final reference viewpoint based on an expression score by assigning the expression score to each of the selected valid reference viewpoints according to the number of invisible fragments of each of the selected valid reference viewpoints and displacement between the main viewpoint and the reference viewpoint.

15. The method for rendering a 6-degree-of-freedom virtual reality of claim 14, wherein the performing of the visibility test includes:
generating depth information of where the reference viewpoint is directed with respect to the reference viewpoint;

generating a depth cubemap by using the generated depth information;

generating POI information based on a plurality of POIs where the main viewpoint is directed to store the generated POI information; and performing a depth test based on the depth cubemap with respect to the reference viewpoint and the POI information with respect to the main viewpoint.

16. The method for rendering a 6-degree-of-freedom virtual reality of claim 15, wherein the generating of the visibility information includes identifying the number of invisible fragments for each reference viewpoint by incrementing a count each time the invisible fragment for the reference viewpoint is generated, during the depth test.

* * * * *